(12) United States Patent
Fujiwara et al.

(10) Patent No.: US 7,533,645 B2
(45) Date of Patent: May 19, 2009

(54) VARIABLE LENGTH INTAKE CONTROL DEVICES AND METHODS FOR A STRADDLE TYPE VEHICLE

(75) Inventors: Hideki Fujiwara, Shizuoka-ken (JP); Akira Someya, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/857,142

(22) Filed: Sep. 18, 2007

(65) Prior Publication Data

US 2008/0092847 A1    Apr. 24, 2008

(30) Foreign Application Priority Data

Sep. 20, 2006  (JP)  .............................. 2006-255050

(51) Int. Cl.
*F02M 35/10* (2006.01)

(52) U.S. Cl. ................................................ 123/184.55
(58) Field of Classification Search ............ 123/184.55
See application file for complete search history.

(56) References Cited

U.S. PATENT DOCUMENTS 4,565,166 A * 1/1986 Takeda .................. 123/184.55
4,664,076 A * 5/1987 Miyano et al. ......... 123/184.55
4,727,829 A * 3/1988 Kondo et al. ........... 123/184.55
4,875,438 A * 10/1989 Suzuki et al. .......... 123/184.55
4,890,586 A * 1/1990 Fujii et al. .............. 123/184.55
5,143,026 A * 9/1992 Brustle et al. .......... 123/184.55
5,197,433 A * 3/1993 Dykstra et al. ......... 123/184.55
5,495,834 A * 3/1996 Rutschmann et al. .. 123/184.31
6,408,810 B1 * 6/2002 Leipelt et al. .......... 123/184.55
6,539,923 B1 * 4/2003 Mengoli ................. 123/184.55

FOREIGN PATENT DOCUMENTS

JP              09-100720        4/1997

* cited by examiner

*Primary Examiner*—Noah Kamen
(74) *Attorney, Agent, or Firm*—Knobbe, Martens, Olson & Bear, LLP (57) ABSTRACT

An intake control device changes an intake conduit length from a first length to a second length according to whether or not an engine speed has reached a predetermined threshold value. The threshold value is predetermined on the basis of both an engine output torque in the state of the intake conduit length set to the first length and an engine output torque in the state of the intake conduit length set to the second length.

18 Claims, 9 Drawing Sheets

| Throttle valve opening Th (%) | Engine speed threshold value Nelim (rpm) |
|---|---|
| 40(Thmin) | 12000 |
| 50 | 11000 |
| 60 | 10000 |
| . . . | . . . |
| . . . | . . . |
| . . . | . . . |
| 100 | 9500 |

Figure 9

VARIABLE LENGTH INTAKE CONTROL DEVICES AND METHODS FOR A STRADDLE TYPE VEHICLE

RELATED APPLICATIONS

This application is related to, and claims priority from, Japanese Patent Application No. 2006-255050, filed Sep. 20, 2006, the entire contents of which are incorporated by reference herein and made a part of the present specification.

BACKGROUND OF THE INVENTION

1. Field of the Invention

The present invention relates to an intake control device, which changes a length of an intake conduit of an engine, to a straddle type vehicle incorporating such a control device, and to methods of setting the condition for changing and methods for changing the length of the intake conduit.

2. Description of the Related Art

Certain intake control devices mounted to straddle type vehicles, such as motorcycles, permit a length of an intake conduit to be changed from a predetermined length to a length different (e.g., shorter) than the predetermined length when an engine load (such as an engine speed or a throttle valve opening) reaches a predetermined threshold value, thereby varying an output characteristic of the engine (see Japanese Patent Publication No. 09-100720). Such an arrangement makes it possible to achieve high intake efficiency over a wide range of engine speed.

SUMMARY OF THE INVENTION

However, a drawback with such intake control devices is that they have uncomfortable rides because the output torque of the engine changes abruptly at the moment the intake conduit length is changed.

Preferred embodiments of the present invention provide intake control devices for a straddle type vehicle, and methods of setting the condition for changing, or methods for changing, the intake conduit length, which allows for a comfortable ride, even when the intake conduit length is changed.

A preferred intake control device according to a preferred embodiment of the present invention includes a mechanism for changing a length of an intake conduit from a predetermined first length to a second length, which may be shorter than the first length, and, preferably, from the second length to the first length. The change occurs when the engine speed reaches a threshold value. In one arrangement, the threshold value is predetermined based on the engine output torque when the intake conduit is set to the first length and an engine output torque when the intake conduit is set to the second length. In one arrangement, the threshold value is between about 9500 revolutions per minute to about 12,000 revolutions per minute.

A preferred embodiment of the present invention involves the intake control device as described above mounted to a straddle type vehicle. In one arrangement, the straddle type vehicle is a motorcycle; however, the preferred embodiments may be incorporated onto other straddle type vehicles, or other types of vehicles, as well.

According to one or more preferred embodiments of the present invention, an abrupt change in the engine output torque is reduced or minimized when the length of the intake conduit is changed, so that ride comfort at the time of changing is improved.

In accordance with another preferred embodiment of the present invention, the threshold value may be determined to be approximately the engine speed at which the engine output torque with the intake conduit set to the first length is substantially the same as the engine output torque with the intake conduit set to the second length. Accordingly, an abrupt change in the engine output torque may be reduced or minimized when the length of the intake conduit is changed, so that ride comfort at the time of change is improved.

In accordance with still another preferred embodiment of the present invention, the threshold value is a predetermined engine speed corresponding to a throttle valve opening position. Further, a sensor or other suitable mechanism for detecting the throttle valve opening position is provided. Also provided is a mechanism for changing the length of the intake conduit between the first length and the second length when the engine speed reaches the threshold value corresponding to the measured throttle valve opening position. Such an arrangement makes it possible to change the length of the intake conduit at an appropriate engine speed corresponding to throttle operation. In at least one arrangement, the length of the intake conduit is changed only if the throttle valve opening position is between about 40% and 100% open.

In accordance with yet another preferred embodiment of the present invention, the threshold value is determined to be approximately the engine speed at which the engine output torque measured corresponding to the engine speed with the intake conduit set to the first length is substantially the same as the engine output torque measured corresponding to the engine speed with the length of the intake conduit set to the second length. Accordingly, an abrupt change in the engine output torque is reduced or minimized when the length of the intake conduit is changed, so that ride comfort at the time of changing is improved.

Another preferred embodiment involves a method for determining a condition at which to change a length of an intake conduit in an intake control device between a first length and a second length. The method includes measuring an engine output characteristic corresponding to the engine speed when the length of the intake conduit is set to the first length, measuring the engine output characteristic corresponding to the engine speed when the length of the intake conduit is set to the second length, and determining the threshold value of an engine speed at which to change the length of the intake conduit based on the engine output characteristic measured when the intake conduit is set to the first length and the engine output characteristic measured when the intake conduit is set to the second length. The method further includes requiring the engine speed to reach the threshold value as a condition for changing the length of the intake conduit.

Preferred embodiments of the present invention make it possible, when the length of the intake conduit is changed in the intake control device, to minimize an abrupt change in the engine output torque and improve ride comfort at the time that the length of the intake conduit is changed.

In accordance with still another preferred embodiment of the present invention, the threshold value is determined by obtaining the engine speed at which the engine output torque when the length of the intake conduit is set to the first length is substantially equal to the engine output torque when the length of the intake conduit is set to the second length. According to such an arrangement, an abrupt change in the engine output torque is reduced or minimized when the length of the intake conduit is changed in the intake control device, so that ride comfort at the time of changing is improved.

Still another preferred embodiment is a method of controlling a variable length intake system for an engine including measuring an engine speed of the engine, comparing the measured engine speed to a threshold engine speed, wherein the threshold engine speed is determined on the basis of a comparison between an engine output characteristic with the intake system in a first orientation defining a first length of an intake conduit and the engine output characteristic with the intake system in a second orientation defining a second length of the intake conduit, and moving the intake system from the first orientation to the second orientation if the measured engine speed is above the threshold engine speed.

BRIEF DESCRIPTION OF THE DRAWINGS

These and other features, aspects and advantages of the present invention are described below with reference to drawings of preferred embodiments, which are intended to illustrate, but not to limit the present invention. The drawings contain nine (9) figures.

DETAILED DESCRIPTION OF THE PREFERRED EMBODIMENTS

Figure 1:
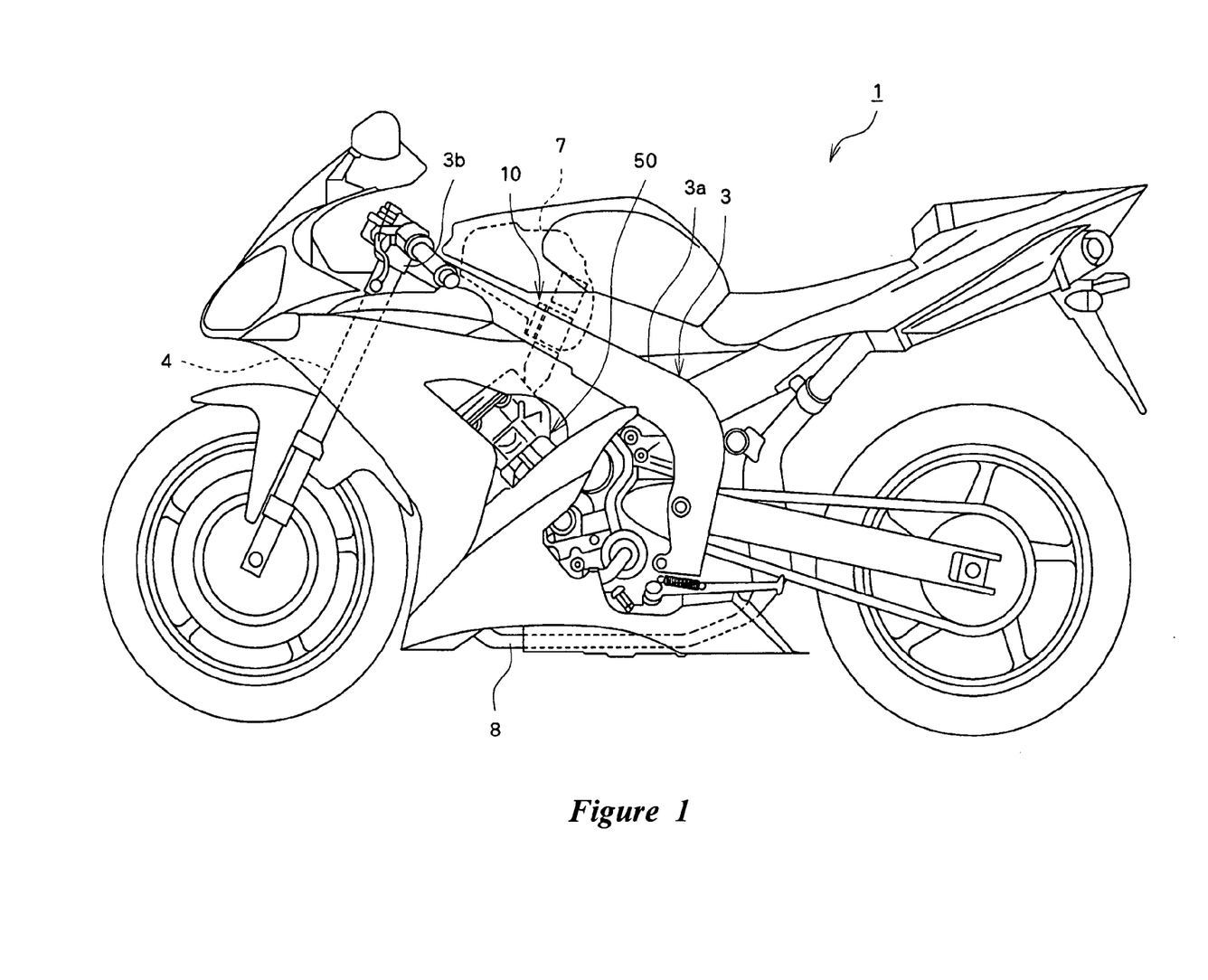
FIG. 1 is a side elevation view of a motorcycle to which an intake control device having certain features, aspects and advantages of the present invention is mounted.
Figure 2:
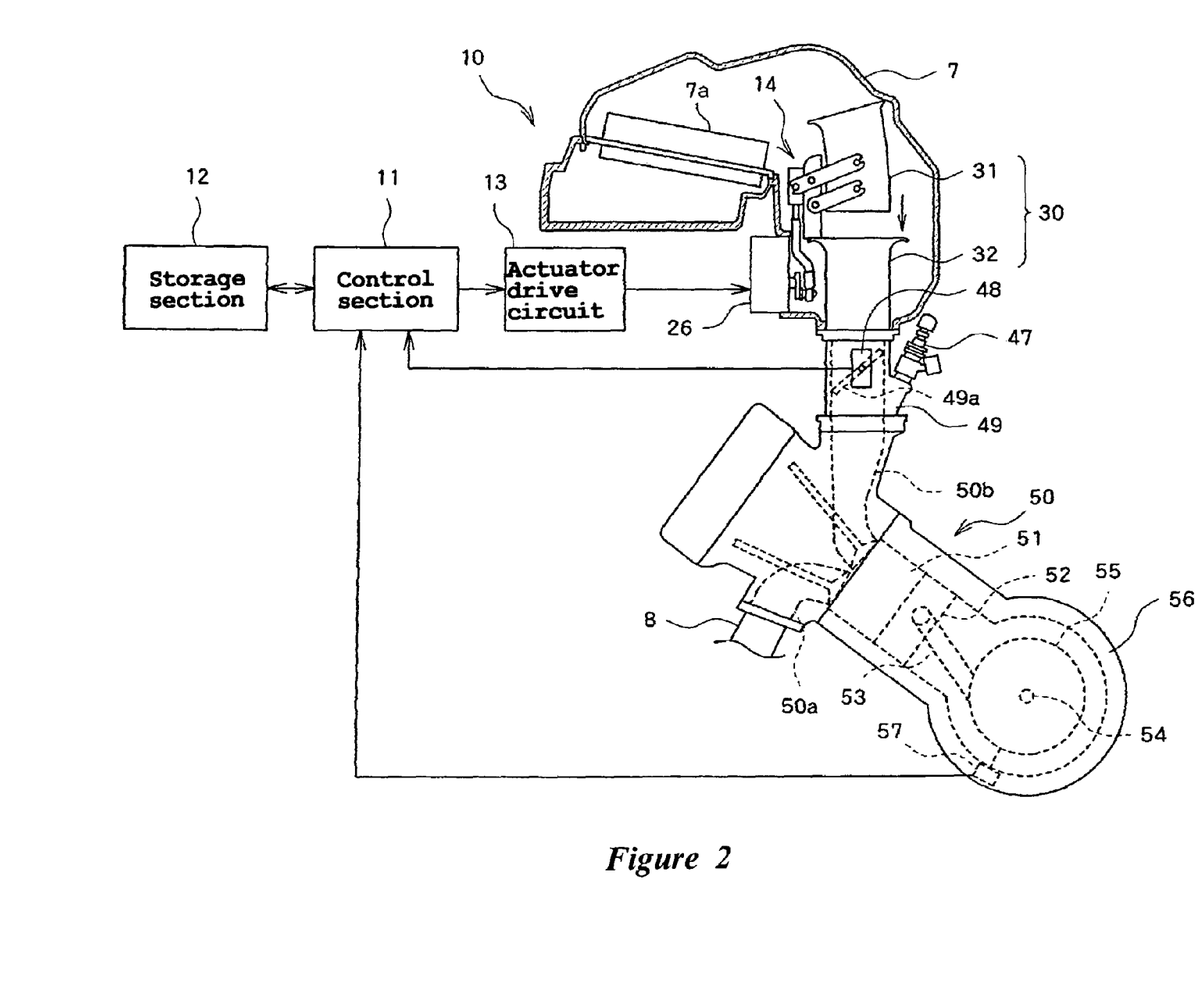
FIG. 2 is a schematic diagram showing structures of the intake control device and an engine.

Hereinafter, one or more embodiments of the present invention are described with reference to several drawings. FIG. 1 is a side elevation view of a motorcycle 1 having an intake control device 10 mounted thereto, which is an example of one embodiment of the present invention. FIG. 2 is a schematic diagram showing structures of the intake control device 10 and an engine 50.

As shown in FIG. 1, the motorcycle 1 has a vehicle frame 3, an engine 50 and an intake control device 10. Also, as shown in FIG. 2, the intake control device 10 includes a control portion or a control unit 11, a storage portion or memory 12, an actuator drive circuit 13 and an intake conduit length varying mechanism 14.

As shown in FIG. 1, the vehicle frame 3 includes a main frame 3a. A front end portion of the main frame 3a has a steering head section 3b supporting a steering shaft 4. The main frame 3a extends obliquely downward to the rear of the vehicle body from the steering head section 3b. The engine 50 is disposed below the main frame 3a.

As shown in FIG. 2, exhaust ports 50a are defined in the engine 50. Exhaust conduits 8 are connected to the respective exhaust ports 50a. Also, intake ports 50b are defined in the engine 50. Throttle bodies 49 are connected to the respective intake ports 50b. Fuel injectors 47 are attached to the respective throttle bodies 49 to inject fuel into intake passages of the throttle bodies 49. A throttle valve 49a is placed in the intake passage of each throttle body 49. A throttle valve position sensor 48 is attached to a lateral side of one throttle body 49 to detect the throttle valve opening position. The throttle valve position sensor 48 outputs a voltage signal corresponding to the throttle valve opening position to the control unit 11. Alternatively, other suitable types of engine air intake regulating valves may also be used, such as the intake valve itself, for example.

An air cleaner 7 is disposed above the engine 50. Air passing through a filter 7a of the air cleaner 7 is filtered thereby and flows into the throttle bodies 49. The air cleaner 7 contains intake conduits 30 through which the air flows to be delivered to the engine. Air introduced into the air cleaner 7 passes through the intake conduits 30 and flows into the throttle bodies 49. Additionally, as will be described later, each of the illustrated intake conduits 30 include a fixed conduit 32 which is connected to the associated throttle body 49 and is fixed thereto, and a movable conduit 31 which is movable in a direction in which the movable conduit 31 is connected to the fixed conduit 32 or in another direction in which the movable conduit 31 is spaced apart from the fixed conduit 32. Because the movable conduit 31 is connected to the fixed conduit 32 or is spaced apart from the fixed conduit 32, the length of the passage of each intake conduit 30 through which the air flows can be changed. Thereby, the output characteristic of the engine 50 varies. In an alternative arrangement, the movable conduit 31 may move relative from the fixed conduit 32 without separating from it, such as a telescoping arrangement, for example.

A cylinder 51 of the engine 50 contains a piston 52. A top end of a connecting rod 53 is coupled with the piston 52, while a bottom end thereof is coupled with a crankshaft 54. A flywheel 55 is mounted to the crankshaft 54. A crank angle sensor 57 is attached to the crankcase 56 to face an outer circumferential surface of the flywheel 55. The crank angle sensor 57 outputs pulse signals with a frequency corresponding to an engine speed. The control unit 11 detects a rotational speed of the engine 50 (hereinafter called "engine speed") based upon the frequency with which the signals are inputted.

As described above, the intake control device 10 includes the control unit 11, the memory 12, the actuator drive circuit 13 and the intake conduit length varying mechanism 14. The intake conduit length varying mechanism 14 is a mechanism which changes the length of the passage through which the air flows in the intake conduit 30 (hereinafter called "intake conduit length"). As described above, in the example discussed herein, the intake conduit 30 includes the fixed conduit 32 and the movable conduit 31. Also, the intake conduit length varying mechanism 14 includes an actuator 26 which changes a position of the movable conduit 31 as well.

The movable conduit 31 moves relative to the fixed conduit 32 between a position where the movable conduit 31 is connected to the fixed conduit 32 and another position where the movable conduit 31 is spaced apart from the connected position. Thereby, the intake conduit length given when the movable conduit 31 is connected to the fixed conduit 32 (first length) is set longer than the intake conduit length given when the movable conduit 31 is spaced apart from the fixed conduit 32 (second length).

The actuator 26 is driven with the drive power supplied from the actuator drive circuit 13 to move the movable conduit 31. The actuator drive circuit 13 supplies a drive current, which corresponds to the signal inputted from the control unit 11, to the actuator 26.

The control unit 11 includes the CPU (central processing unit) and controls various electrical components mounted to the vehicle body in accordance with programs stored in the memory 12. Particularly, in the illustrated arrangement, the control unit 11 moves the movable conduit 31 in accordance with an engine load (for example, an engine speed and a throttle valve opening) to execute processes for changing the intake conduit length. The processes executed by the control unit 11 are described further below.

The memory 12 may include non-volatile memory and/or volatile memory to hold programs executed by the control unit 11. In the illustrated arrangement, particularly the memory 12 holds the condition on which the control unit 11 changes the intake conduit length. The change condition is described in greater detail below.

Figure 3:
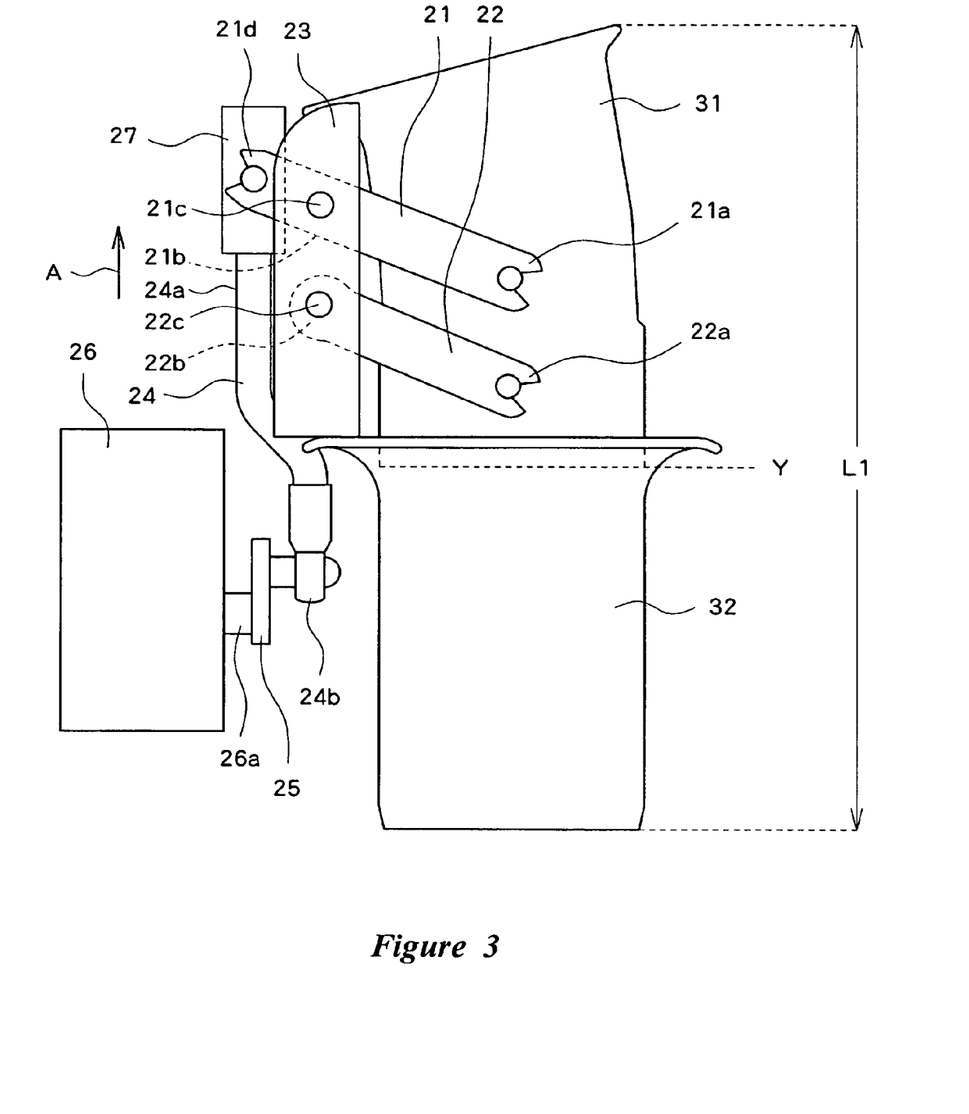
FIG. 3 is a schematic view showing an example of an intake conduit length varying mechanism. A movable conduit in the figure is coupled to a fixed conduit.
Figure 4:
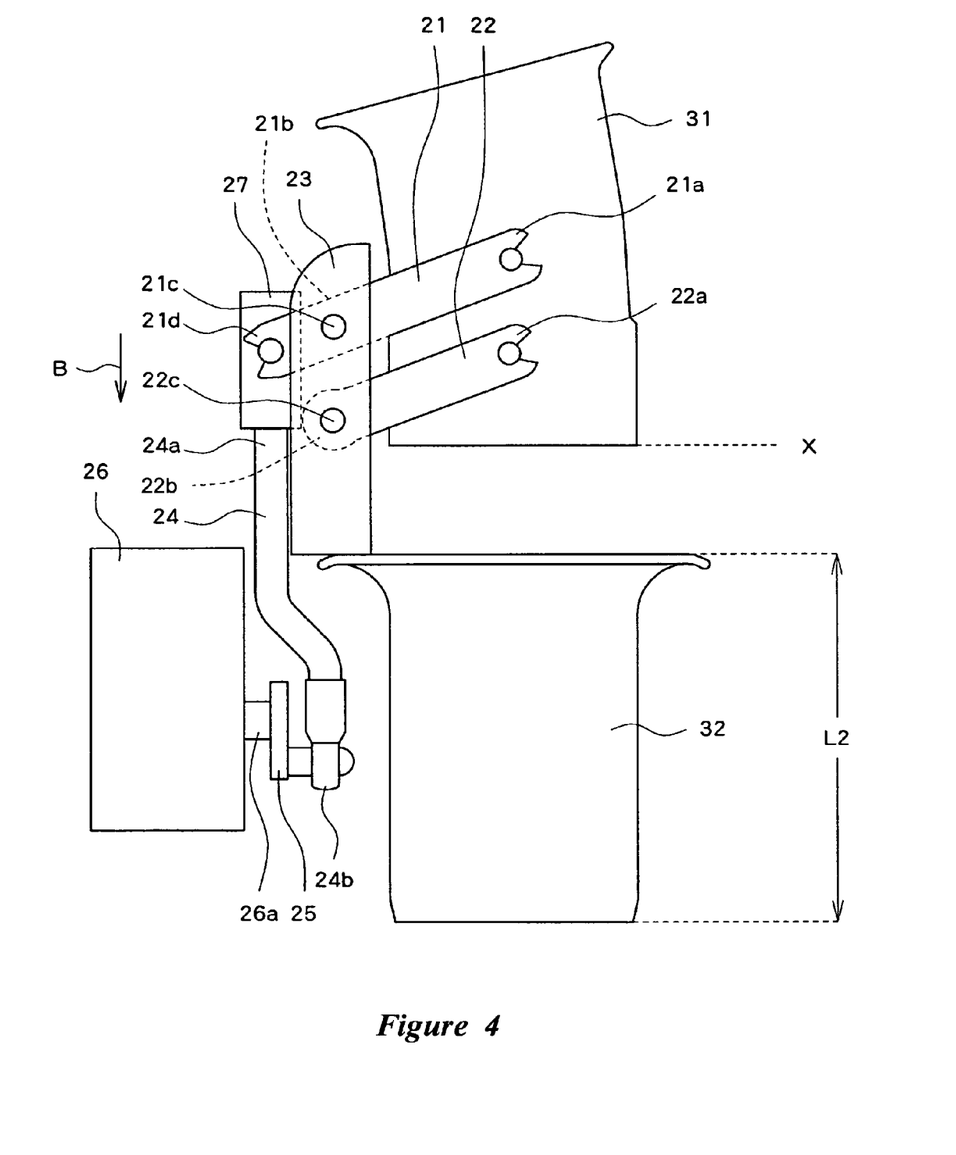
FIG. 4 is a schematic view showing the example of the intake conduit length varying mechanism. The movable conduit in the figure is spaced apart from the fixed conduit.

The example of the intake conduit length varying mechanism 14 is described in detail below. FIGS. 3 and 4 are schematic views of the intake conduit length varying mechanism 14. Additionally, in the example shown in FIG. 3, the movable conduit 31 is placed at a position Y where the movable conduit 31 is connected to the fixed conduit 32 (hereinafter called "connected position"). The movable conduit 31, in the example shown in FIG. 4, is placed at a position X where the movable conduit 31 is spaced apart from the fixed conduit 32 (hereinafter called "disconnected position").

The movable conduit 31 is supported by one end 21a of an upper arm 21 and one end 22a of a lower arm 22 for movement in a vertical direction. The upper arm 21 and the lower arm 22 are arranged next to each other in the vertical direction to extend parallel to each other. The other end 22b of the lower arm 22 is supported by a pillar 23 extending upward from a rim portion of the fixed conduit 32, while a mid portion 21b of the upper arm 21 is supported by the pillar 23. Each of the other end 22b and the mid portion 21b has a fulcrum 21c, 22c. The upper arm 21 and the lower arm 22 are pivotable about the respective fulcrums 21c, 22c under a condition that the relationships in position between the upper and lower arms 21, 22 extending parallel to each other are maintained. The other end 21d of the upper arm 21 is connected to one end 24a of an arm 24 which is movable vertically through a connecting member 27. The other end 24b of the arm 24 is connected to an output shaft 26a of the actuator 26 through a coupling member 25. The coupling member 25 extends in a radial direction of the output shaft 26a. Therefore, the other end 24b of the arm 24 is spaced apart from the output shaft 26a of the actuator 26 in the radial direction.

An operation of the intake conduit length varying mechanism 14 is now described. When the output shaft 26a of the actuator 26 rotates in a direction to raise the arm 24 upward (in the direction indicated by the mark A of FIG. 3), the upper arm 21 and the lower arm 22 pivot downward about the respective fulcrums 21c, 22c. As a result, the movable conduit 31 moves downward to be placed at the connected position Y. In this orientation, the intake conduit length is set to the length L1 (hereinafter called "the length of connection") that is made by adding the lengths of the movable conduit 31 and the fixed conduit 32. On the other hand, when the output shaft 26a of the actuator 26 rotates in a reverse direction to lower the arm 24 downward (in the direction indicated by the mark B of FIG. 4), the upper arm 21 and the lower arm 22 pivot upward about the respective fulcrums 21c, 22c. As a result, the movable conduit 31 moves upward to be placed at the disconnected position X. In this orientation, the length of the movable conduit 31 is no longer included in the intake conduit length. The intake conduit length is thus set to the length L2 (hereinafter called "the length of disconnection") that is shorter than the length of connection L1. Additionally, in accordance with processes executed by the control unit 11 which is described later, the movable conduit 31 is placed at the disconnected position X when the engine load is high such as, for example, when the vehicle is accelerated, and the movable conduit 31 is placed at the connected position Y when the engine load is low.

Figure 5:
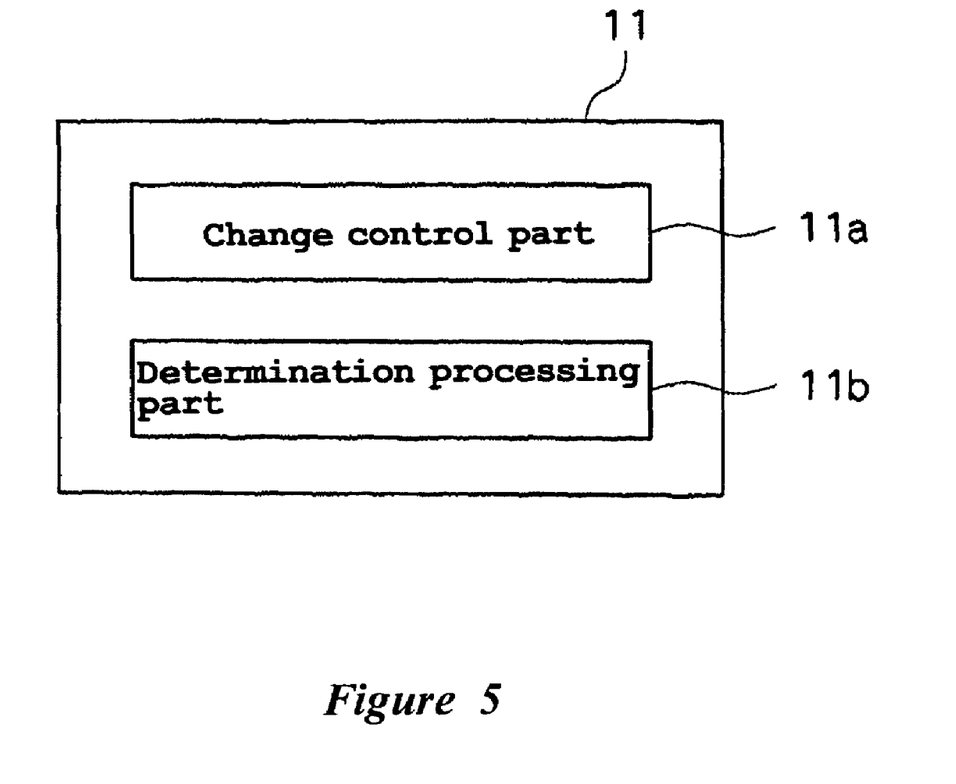
FIG. 5 is a functional block diagram of a control unit incorporated in the intake control device.

The processes executed by the control unit 11 are described below. FIG. 5 is a functional block diagram showing the preferred processes executed by the control unit 11. As shown in FIG. 5, the control unit 11 includes a change control part 11a and a determination processing part 11b.

The change control part 11a executes processes for changing the intake conduit length between the length of connection L1 and the length of disconnection L2 in response to a determination result of the determination processing part 11b to be described hereinafter. Specifically, if a running state of the vehicle is determined to correspond to a predetermined condition (hereinafter called "change condition") in processes of the determination processing part 11b, to be described later, the change control part 11a executes processes to move the movable conduit 31 from the connected position Y to the disconnected position X. Also, if the running state is determined not to correspond to the change condition in the processes of the determination processing part 11b, the change control part 11a executes processes to move the movable conduit 31 from the disconnected position X to the connected position Y. The processes for changing the intake conduit length are executed, for example, as described below.

A position detecting sensor (for example, a potentiometer) for detecting a position of the movable conduit 31 is previously disposed in the intake conduit length varying mechanism 14. The change control part 11a outputs a signal commanding a drive of the actuator 26 to the actuator drive circuit 13 while detecting the position of the movable conduit 31 based upon a signal inputted from the position detecting sensor. When the movable conduit 31 reaches the connected position Y or the disconnected position X, the change control unit 11a stops outputting the signal to the actuator drive circuit 13 to stop driving the actuator 26.

Alternatively, the change control part 11a can drive the actuator 26 for a predetermined period of time to move the movable conduit 31 from the connected position Y to the disconnected position X without detecting the position of the movable conduit 31. In such an arrangement, the predetermined time is a required time for the movable conduit 31 to move from the connected position Y to the disconnected position X or from the disconnected position X to the connected position Y. The predetermined time may be set in a production stage or the like of the intake control device 10.

The determination process section 11b determines whether or not the running state of the vehicle corresponds to the change condition under which the change control part 11a should change the intake conduit length. Specifically, the determination process part 11b determines whether or not the engine speed has exceeded the predetermined engine speed threshold value by detecting the engine speed on the basis of the signal inputted from the crank angle sensor 57. In case the engine speed has exceeded the engine speed threshold value, the determination process part 11b determines that the running state of the vehicle meets the change condition. As a result, the above-described change control part 11a moves the movable conduit 31 to the disconnected position X to set the intake conduit length to the length of disconnection L2. On the other hand, in case the engine speed has not exceeded the engine speed threshold value, the determination process part 11b determines that the running state of the vehicle does not meet the change condition, and the change control part 11a moves the movable conduit 31 to the connected position Y to set the intake conduit length to the length of connection L1.

Figure 6:
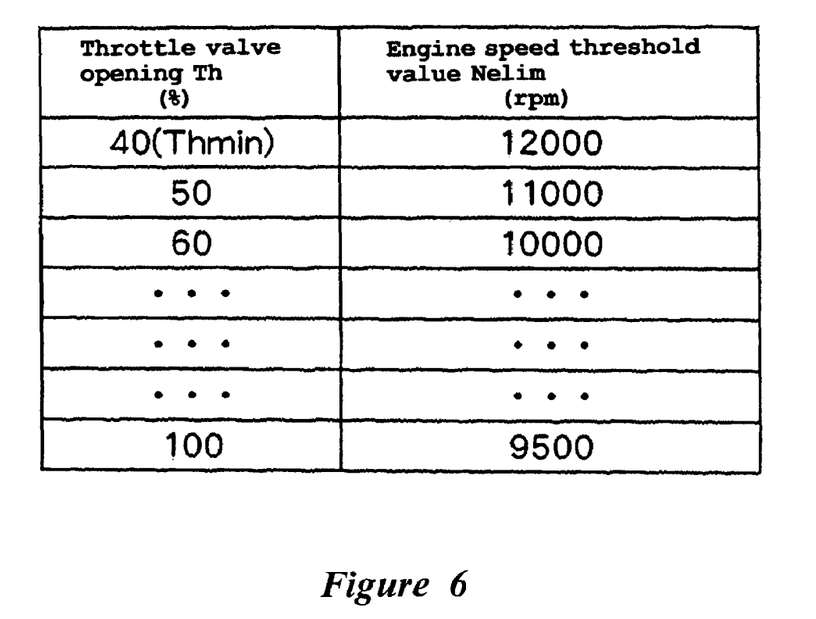
FIG. 6 is an example of a table in which a throttle valve opening (Th) and an engine speed threshold value (Nelim) are stored in correspondence with each other.

It is also possible to set the engine speed threshold value corresponding to the throttle valve opening. FIG. 6 shows an example table (hereinafter called "threshold value table") of making correspondence between the engine speed threshold value Nelim and throttle valve opening Th. The table is stored, for example, in the memory 12. In the threshold value table shown in the figure, the engine speed threshold value Nelim is set to decrease as the throttle valve opening Th increases, or as the intake air amount of the engine 50 increases. Of the throttle valve opening Th to which the engine speed threshold value Nelim is made to correspond, the smallest Thmin (hereinafter called "minimum throttle valve opening for change") is stored in the uppermost stage in the threshold value table. In the case where such a table is stored in the memory 12, the determination process with the determination process part 11b is implemented as follows.

The determination process part 11b, at specified sampling intervals, detects the throttle valve opening Th on the basis of signals outputted from the throttle position sensor 48 and also detects the engine speed on the basis of signals outputted from the crank angle sensor 57. The determination process part 11b also refers to the threshold value table to acquire the engine speed threshold value Nelim corresponding to the throttle valve opening Th and to determine whether or not the detected engine speed has exceeded the engine speed threshold value Nelim. Here, in case the engine speed has exceeded the engine speed threshold value Nelim, the determination process part 11b determines that the change condition is met. As a result, the intake conduit length is set to the length of disconnection L2 by the process with the change control part 11a. On the other hand, in case the change condition is not met, the intake conduit length is set to the length of connection L1 by the process with the change control part 11a.

Incidentally, the determination process section 11b may implement the process of interpolating the engine speed threshold value Nelim on the basis of the throttle valve opening Th detected with the throttle position sensor 48 in the process of acquiring the engine speed threshold value Nelim. For example, in case the detected throttle valve opening Th (for example 45%) is not stored in the threshold value table, the determination process section 11b refers to the threshold value table to obtain two throttle valve openings (40% and 50% in the example shown in FIG. 6) out of a plural number of throttle valve openings Th, stored in the threshold value table, so that the detected throttle valve opening falls between the two throttle valve openings obtained. Then, on the basis of the two throttle valve openings Th and engine speed threshold values Nelim (12000 rpm and 11000 rpm here) made to correspond to the two throttle valve openings on the threshold value table, an engine speed threshold value Nelim corresponding to the detected throttle valve opening Th (45% in this example) is interpolated.

Hereinafter, the engine speed threshold value Nelim is described in detail. The engine speed threshold value Nelim is the value determined on the basis of both the engine output torque when the intake conduit length is set to the above-described length of connection L1 and the engine output torque when the intake conduit length is set to the above-described length of disconnection L2. To be more specific, the engine speed threshold value Nelim is preset to an engine speed at which the difference between the engine output torque when the intake conduit length is set to the length of connection L1 and the engine output torque when the intake conduit length is set to the length of disconnection L2 is smaller than a specified value.

For example, the engine speed threshold value Nelim is preset to an engine speed at which the engine output torque when the intake conduit length is set to the length of connection L1 is substantially equal to the engine output torque when the intake conduit length is set to the length of disconnection L2. In that case, it is possible to improve ride comfort when the engine speed passes through the threshold value Nelim while the vehicle is running, as the change in the output torque due to changing the intake conduit length is decreased.

Figure 7:
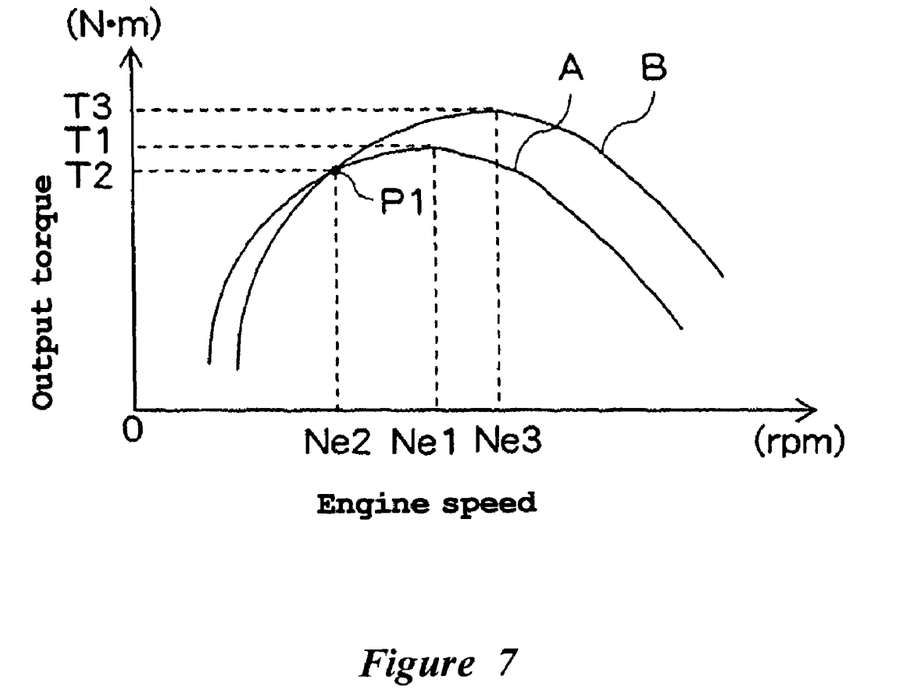
FIG. 7 is an example of a graph of the relationship between engine speed and engine output torque (output characteristic). For example, Ne2 in the figure is set as the engine speed threshold value Nelim.

FIG. 7 is an example graph of relationship between the engine speed and the engine output torque. In the figure, the curve A is an example torque curve (a curve showing the change in the engine output torque) with the intake conduit length set to the length of connection L1. The curve B is an example torque curve with the intake conduit length set to the length of disconnection L2. Here, it is assumed that the throttle valve opening Th is set to any constant value.

As shown on the torque curve A in the figure, when the intake conduit length is set to the length of connection L1, as the engine speed increases from the minimum value (for example, an idling engine speed in the state of the intake conduit length set to the length of connection L1), the output torque (hereinafter called "connected state output torque") also increases. The connected state output torque reaches the maximum value T1 at the engine speed Ne1. Thereafter, the connected state output torque decreases with an increase in the engine speed.

On the other hand, when the intake conduit length is set to the length of disconnection L2, as shown on the torque curve B, as the engine speed increases from the minimum value (for example, an idling engine speed in the state of the intake conduit length set to the length of disconnection L2), the output torque (hereinafter called "disconnected state output torque") also increases. The torque curve B intersects the torque curve A at the point P of intersection. In other words, the disconnected state output torque is equal to T2 at an engine speed Ne2, which is at least substantially equal to the connected state output torque at the engine speed Ne2. In this case, the engine speed Ne2 is lower than the engine speed Ne1. The disconnected state output torque increases with the increase in the engine speed to reach the maximum value T3 at an engine speed Ne3.

When the engine output characteristic is expressed through such torque curves, the engine speed threshold value Nelim is obtained and the change condition is set, for example, as follows. First, the engine output characteristic (output torque corresponding to the engine speed) when the intake conduit length is set to the length of connection L1 (here, when the movable conduit 31 is in the connected position Y) is measured to obtain a torque curve A, such as shown in FIG. 7. The engine output characteristic is also measured when the intake conduit length is set to the length of disconnection L2 (here, when the movable conduit 31 is in the disconnected position X) to obtain a torque curve B, such as shown in FIG. 7.

Next, the engine speed threshold value Nelim is determined on the basis of both the output characteristic when the intake conduit length is set to the length of connection L1 and the output characteristic when the intake conduit length is set to the length of disconnection L2 (threshold value determining step). For example, as described above, the engine speed at which the connected state output torque is equal to the disconnected state output torque is obtained and specified as the engine speed threshold value Nelim (in FIG. 7, the engine speed Ne2), and then stored in the memory 12.

While the above description is based on the assumption that the throttle valve opening is set to any constant value, the engine speed threshold value Nelim corresponding to each throttle valve opening may be determined with the method described so far. Specifically, the torque curve A when the intake conduit length is set to the length of connection L1 and the torque curve B when the intake conduit length is set to the length of disconnection L2 are obtained at a throttle valve opening Thi. Then, the engine speed at the point of intersection of the torque curve A and the torque curve B is the engine speed threshold value Nelim at the throttle valve opening Thi. After that, the engine speed threshold value Nelim corresponding to each throttle valve opening may be obtained by sequentially increasing or decreasing the throttle valve opening Thi.

It is also possible, after obtaining at least two engine speed threshold values Nelim that correspond to set throttle valve opening values using the above-described method, to calculate the engine speed threshold value Nelim corresponding to any throttle valve opening using a predetermined equation.

Figure 8:
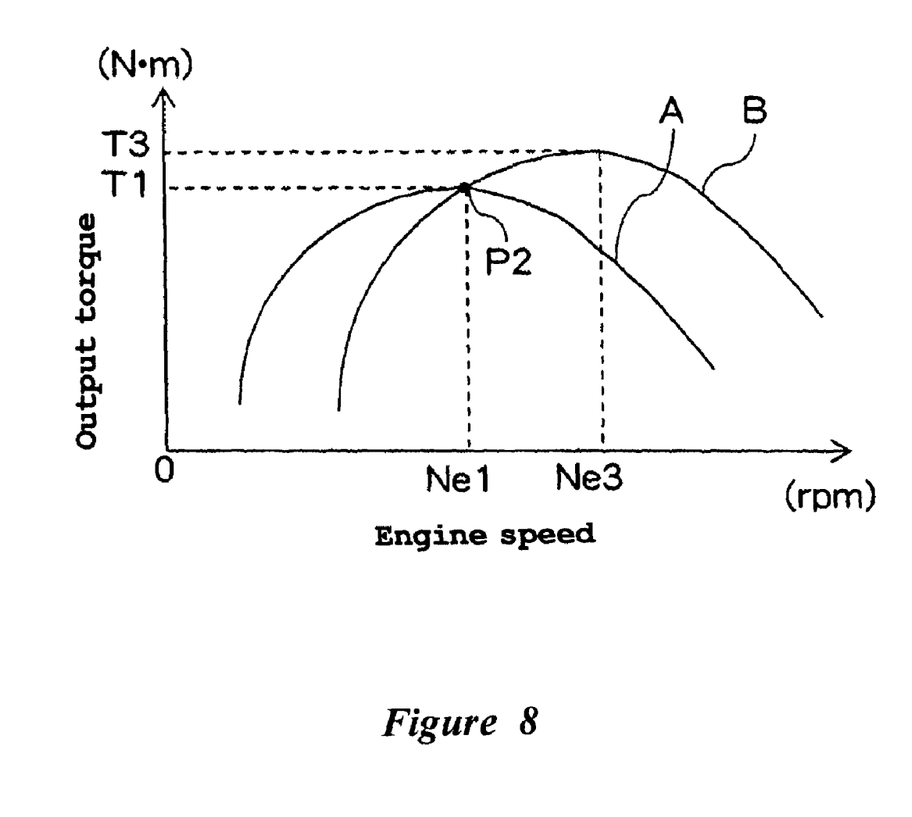
FIG. 8 is another example of a graph of the relationship between engine speed and engine output torque (output characteristic). For example, Ne1 in the figure is set as the engine speed threshold value Nelim.

It is also possible to determine the form, or the like (for example the lengths and diameters of the movable conduit 31 and the fixed conduit 32), of the intake conduit length varying mechanism 14 so that the connected state output torque of the torque curve A is equal to the disconnected state output torque of the torque curve B at the engine speed Ne1, the point at which the connected state output torque has its maximum value T1 as shown in the graph of FIG. 8. In that case, it is possible to set the engine speed Ne1, at the point where the connected state output torque becomes the maximum value T1, as the engine speed threshold value Nelim.

Figure 9:
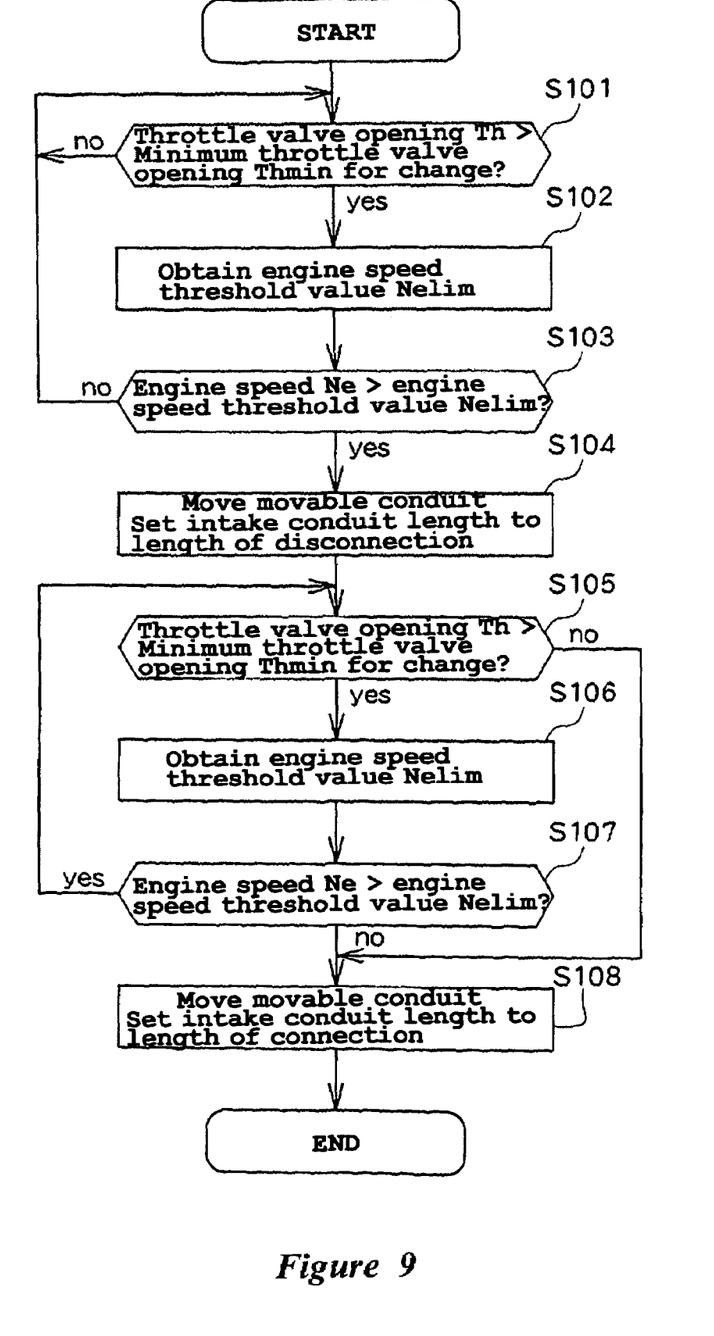
FIG. 9 is a flowchart showing an example of the processes implemented by the control unit.

Hereinafter, the process flow that the control unit 11 implements is described. FIG. 9 is a flowchart showing an example of processes implemented by the control unit 11. Incidentally, the description of the example here assumes that the change condition includes the fact that the throttle valve opening Th is greater than the above-described minimum throttle valve opening Thminr for change. The description also assumes that the movable conduit 31 is disposed beforehand in the connected position Y.

First, the determination process part 11b detects the throttle valve opening Th to determine whether or not the throttle valve opening Th is greater than the minimum throttle valve opening Thminr for change (S101). In case the throttle valve opening Th is smaller than the minimum throttle valve opening Thminr for change, the process of S101 is implemented until the throttle valve opening Th exceeds the minimum throttle valve opening Thminr for change.

In case the determination of S101 results in the throttle valve opening Th having a greater value than the minimum throttle valve opening Thlim necessary for change, the determination process part 11b obtains the engine speed threshold value Nelim corresponding to the detected throttle valve opening Th (S102). For example, as described above, the determination process part 11b obtains the engine speed threshold value Nelim on the basis of the threshold value table and preset equation. The determination process part 11b detects the engine speed Ne on the basis of the signals inputted from the crank angle sensor 57, and determines whether or not the engine speed Ne is greater than the engine speed threshold value Nelim (S103). In case the engine speed Ne is not greater than the engine speed threshold value Nelim, the process step goes back to S101 to repeat the process steps.

On the other hand, in case the detected engine speed Ne is greater than the engine speed threshold value Nelim, the determination process part 11b determines that the running state of the vehicle meets the change condition. As a result, the change control part 11a moves the movable conduit 31 to the disconnected position X to set the intake conduit length to the length of disconnection L2 (S104).

After that, the determination process part 11b detects again the throttle valve opening Th and determines whether or not the throttle valve opening Th is greater than the minimum throttle valve opening Thminr for change (S105). In case the throttle valve opening Th is not greater than the minimum throttle valve opening Thminr necessary for change, the determination process section 11b determines that the running state of the vehicle does not meet the change condition anymore. As a result, the change control part 11a moves the movable conduit 31 back to the connected position Y to set the intake conduit length to the length of connection L1 (S108).

On the other hand, in case the determination result in S105 shows that the throttle valve opening Th is greater than the minimum throttle valve opening Thminr necessary for change, the determination process section 11b obtains the engine speed threshold value Nelim corresponding to the throttle valve opening Th detected in S105 (S106). Then, the determination process section 11b detects the engine speed Ne again and determines whether or not the engine speed Ne is greater than the engine speed threshold value Nelim (S107). In case the engine speed Ne is still greater than the engine speed threshold value Nelim, the process step goes back to S105 to implement the process again from that step.

On the other hand, in case the determination result in S107 shows that the engine speed Ne is not greater than the engine speed threshold value Nelim, the determination process section 11b determines that the running state of the vehicle does not meet the change condition anymore. As a result, the change control part 11a moves the movable conduit 31 back to the connected position Y to set the intake conduit length to the length of connection L1 (S108). The control unit 11 repeats the above process while the vehicle is running.

In the flowchart shown in FIG. 9, in the process steps (from S105 to S107) of determining whether or not to return the intake conduit length from the length of disconnection L2 to the length of connection L1, the determining process part 11b obtains the engine speed threshold value Nelim corresponding to the detected throttle valve opening Th (S106) to determine whether or not the detected engine speed Ne is greater than the engine speed threshold value Nelim (S107), as already described above. However, it is also possible to determine in S107 whether or not the engine speed Ne is greater than a predetermined constant threshold value, instead of obtaining the engine speed threshold value Nelim corresponding to the detected throttle valve opening Th. So, if the engine speed Ne is not greater than the predetermined constant threshold value, the running state of the vehicle can be determined not to meet the change condition anymore.

Utilizing the intake control device 10 described above, where the engine speed threshold value Nelim is determined based on both the engine output torque when the intake conduit length is set to the length of connection L1 and the engine output torque when the intake conduit length is set to the length of disconnection L2, it is possible to reduce or minimize an change in the output torque, and allow for comfortable riding even when the intake conduit length is changed.

The present invention is not limited to the above intake control device 10, but various modifications are possible. For example, while the engine speed threshold value Nelim is stored in the threshold value table, as shown in FIG. 6, in the memory 12 of the intake control device 10, it is also possible, for example, to store an equation expressing the correlation between the throttle valve opening Th and the engine speed threshold value Nelim in the memory 12. Then, the control unit 11 may input the throttle valve opening value Th, detected with the throttle position sensor 48, into the equation to calculate the engine speed threshold value Nelim.

Further, the intake conduit length varying mechanism 14, provided in the intake control device 10, changes the intake conduit length by connecting the movable conduit 31 to the fixed conduit 32 or disconnecting the movable conduit 31 from the fixed conduit 32. Alternatively, for example, the intake conduit length varying mechanism 14 may be provided with a plurality of intake passages, which contain valves, through which air flows into the engine. In that case, the control unit may change the intake conduit length by opening or closing the valves according to engine load or the like.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present control device and methods have been described in the context of particularly preferred embodiments, the skilled artisan will appreciate, in view of the present disclosure, that certain advantages, features and aspects of the device and methods may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. An engine air intake control device, comprising:
    a variable length intake conduit movable from a first orientation wherein the intake conduit has a first length to a second orientation wherein the intake conduit has a second length, wherein the intake assembly moves from the first orientation to the second orientation when an engine speed of the engine reaches a threshold value;
    wherein the threshold value is set based on a determination that involves both a first engine output torque when the intake conduit is set to the first length and a second engine output torque when the intake conduit is set to the second length;
    wherein the variable length intake conduit comprises a fixed portion coupled to the engine, a movable portion positioned upstream from the fixed portion, and a conduit length varying mechanism that moves the movable portion along a generally linear path of movement toward and away from the fixed portion, wherein the movable portion is coupled to the fixed portion in the first orientation so that at least a part of the movable portion fits within and overlaps at least a part of the fixed portion along the path of movement, and the movable portion is separated from the fixed portion in the second orientation.

2. The intake control device of claim 1, wherein the second length is shorter than the first length.

3. The intake control device of claim 1, wherein the engine air intake device is incorporated into a straddle-type vehicle.

4. The intake control device of claim 1, wherein the threshold value is an engine speed at which the first engine output torque is substantially equal to the second engine output torque.

5. An engine intake control device comprising:
    a variable length intake conduit movable from a first orientation wherein the intake conduit has a first length to a second orientation wherein the intake conduit has a second length, wherein the intake assembly moves from the first orientation to the second orientation when an engine speed of the engine reaches a threshold value;
    a throttle valve; and
    a throttle valve position sensor that detects a position of the throttle valve;
    wherein the threshold value is set based on a determination that involves both a first engine output torque when the intake conduit is set to the first length and a second engine output torque when the intake conduit is set to the second length;
    wherein the threshold value is a predetermined engine speed that corresponds to the throttle valve position detected by the throttle valve position sensor.

6. The intake control device of claim 5, wherein the intake assembly only moves from the first orientation to the second orientation if the throttle valve position is above a threshold throttle valve position.

7. The intake control device of claim 6, wherein the threshold throttle valve position is about 40% open.

8. A method of determining a condition at which to change a length of an intake conduit in an engine air intake system from a first length to a second length, the method comprising:
    measuring an engine output characteristic that corresponds to engine speed with the intake conduit set to the first length wherein at least a part of a movable portion fits within and overlaps at least a part of a fixed portion along a path of movement;
    moving the movable portion of the intake conduit along a generally linear path of movement away from the fixed portion of the intake conduit;
    measuring the engine output characteristic with the intake conduit set to the second length;
    determining the threshold value of an engine speed at which to change the length of the intake conduit based on both the engine output characteristic measured with the intake conduit set to the first length and the engine output characteristic measured with the intake conduit set to the second length; and
    setting, as a condition for changing the length of the intake conduit, that the engine speed must reach the threshold value.

9. The method of claim 8, wherein the threshold value of the engine speed is determined by identifying an engine speed at which the engine output torque with the intake conduit set to the first length is substantially equal to the engine output torque with the intake conduit set to the second length.

10. The method of claim 8, further comprising setting an additional condition for changing the length of the intake conduit that a throttle valve position of a throttle valve of the engine air intake system must be above a threshold throttle valve position.

11. A method of determining a condition at which to change a length of an intake conduit in an engine air intake system from a first length to a second length, the method comprising:

measuring an engine output characteristic that corresponds to engine speed with the intake conduit set to the first length;

measuring the engine output characteristic with the intake conduit set to the second length;

determining the threshold value of an engine speed at which to change the length of the intake conduit based on both the engine output characteristic measured with the intake conduit set to the first length and the engine output characteristic measured with the intake conduit set to the second length;

setting, as a condition for changing the length of the intake conduit, that the engine speed must reach the threshold value;

wherein the threshold value of the engine speed is determined by identifying an engine speed at which the engine output torque with the intake conduit set to the first length is substantially equal to the engine output torque with the intake conduit set to the second length;

determining the threshold value for a plurality of throttle valve positions of a throttle valve of the engine air intake system.

12. A method of controlling a variable length intake system for an engine comprising:

measuring an engine speed of the engine;

comparing the measured engine speed to a threshold engine speed, wherein the threshold engine speed is determined on the basis of a comparison between an engine output characteristic with the intake system in a first orientation defining a first length of an intake conduit wherein at least a part of a movable portion fits within and overlaps at least a part of a fixed portion along a generally linear path of movement, and the engine output characteristic with the intake system in a second orientation defining a second length of the intake conduit;

moving the intake system from the first orientation to the second orientation, by moving the movable portion along the generally linear path of movement away from the fixed portion of the intake system, if the measured engine speed is above the threshold engine speed.

13. The method of claim 12, further comprising setting the threshold engine speed as an engine speed at which the engine output characteristic with the intake system in the first orientation is substantially equal to the engine output characteristic with the intake system in the second orientation.

14. The method of claim 12, wherein the engine output characteristic is an engine output torque.

15. The method of claim 12, wherein the moving of the intake system from the first orientation defining the first length to the second orientation defining the second length reduces the length of the intake system.

16. The method of claim 12, further comprising detecting a position of a throttle valve of the engine and only moving the intake system from the first orientation to the second orientation if the throttle valve position is above a threshold position.

17. The method of claim 16, wherein the threshold throttle valve position is about 40% open.

18. The method of claim 12, further comprising moving the intake system from the second orientation to the first orientation if the measured engine speed is below the threshold engine speed.

* * * * *